United States Patent
Comolli et al.

(10) Patent No.: US 6,190,542 B1
(45) Date of Patent: *Feb. 20, 2001

(54) CATALYTIC MULTI-STAGE PROCESS FOR HYDROCONVERSION AND REFINING HYDROCARBON FEEDS

(75) Inventors: Alfred G. Comolli, Yardley, PA (US); Lap-Keung Lee, Cranbury, NJ (US)

(73) Assignee: Hydrocarbon Technologies, Inc., Lawrenceville, NJ (US)

(*) Notice: Under 35 U.S.C. 154(b), the term of this patent shall be extended for 0 days.

This patent is subject to a terminal disclaimer.

(21) Appl. No.: 09/241,505

(22) Filed: Feb. 1, 1999

Related U.S. Application Data

(63) Continuation-in-part of application No. 08/742,541, filed on Nov. 1, 1996, now Pat. No. 5,871,638, which is a continuation-in-part of application No. 08/609,759, filed on Feb. 23, 1996, now Pat. No. 5,866,501.

(51) Int. Cl.[7] .................................................. C10G 1/06

(52) U.S. Cl. ........................ 208/423; 208/413; 208/418

(58) Field of Search ..................... 201/2.8, 25; 208/422, 208/412, 413, 415, 416, 417, 418, 420, 423; 585/241

(56) References Cited

U.S. PATENT DOCUMENTS 4,485,008 * 11/1984 Maa et al. .......................... 208/8 LE

* cited by examiner

Primary Examiner—Bekir L. Yildirim
(74) Attorney, Agent, or Firm—Fred A. Wilson

(57) ABSTRACT

A multi-stage catalytic hydrogenation and hydroconversion process for heavy hydrocarbon feed materials such as coal, heavy petroleum fractions, and plastic waste materials. In the process, the feedstock is reacted in a first-stage, back-mixed catalytic reactor with a highly dispersed iron-based catalyst having a powder, gel or liquid form. The reactor effluent is pressure-reduced, vapors and light distillate fractions are removed overhead, and the heavier liquid fraction is fed to a second stage back-mixed catalytic reactor. The first and second stage catalytic reactors are operated at 700–850° F. temperature, 1000–3500 psig hydrogen partial pressure and 20–80 lb./hr per ft$^3$ reactor space velocity. The vapor and light distillates liquid fractions removed from both the first and second stage reactor effluent streams are combined and passed to an in-line, fixed-bed catalytic hydrotreater for heteroatom removal and for producing high quality naphtha and mid-distillate or a full-range distillate product. The remaining separator bottoms liquid fractions are distilled at successive atmospheric and vacuum pressures, low and intermediate-boiling hydrocarbon liquid products are withdrawn, and heavier distillate fractions are recycled and further upgraded to provide additional low-boiling hydrocarbon liquid products. This catalytic multi-stage hydrogenation process provides improved flexibility for hydroprocessing the various carbonaceous feedstocks and adjusting to desired product structures and for improved economy of operations.

22 Claims, 2 Drawing Sheets

CATALYTIC MULTI-STAGE PROCESS FOR HYDROCONVERSION AND REFINING HYDROCARBON FEEDS

This is a continuation-in-part application of Ser. No. 08/742,541 filed Nov. 1, 1996, now U.S. Pat. No. 5,871,638; which was a continuation-in-part of application Ser. No. 08/609/759, filed Feb. 23, 1996 now U.S. Pat. No. 5,866, 501.

This Invention was made with support under Contract No. DE-AC22-92PC92148 awarded by the Department of Energy, and the Government has certain rights in this invention.

BACKGROUND OF INVENTION

This invention pertains to a catalytic multistage process for hydrogenation and hydroconversion of heavy hydrocarbon feed materials by utilizing a highly-dispersed iron-based catalyst to produce lower-boiling hydrocarbon liquid fuel products. The invention pertains particularly to such catalytic multi-stage hydrogenation process utilizing an in-line catalytic hydrotreating step for feedstreams of coal, heavy petroleum residua, plastic wastes, and combinations thereof.

Coal hydrogenation and liquefaction processes using various iron-containing compounds such as pyrites ($FeS_2$) and red mud ($Fe_2O_3$) as catalysts have been well known for many years. Such particulate iron-containing catalyst compounds were usually added in small amounts to a coal-oil slurry feedstream upstream of a catalytic reactor operated at elevated temperature and pressure conditions. However, because of the generally low effectiveness of such known iron-based catalytic compounds, primarily due to their low initial surface areas and inability to provide high levels of dispersion under reaction conditions, catalytic hydroconversion processes for coal and heavy petroleum resid feedstocks which have been developed during the past 30 years have usually utilized a bed of particulate supported type catalysts in the reactors. Such supported catalysts may be beads or extrudates containing small amounts of one or more active promoter metals such as cobalt, molybdenum or nickel deposited on an inert support material such as alumina or silica. Such particulate supported catalysts are used in either downflow fixed bed type reactors or in upflow ebullated bed reactors maintained at desired reaction conditions of temperature, pressure and space velocity.

Although such particulate supported type catalysts such as cobalt-molybdenum or nickel-molybdenum deposited on alumina or silica supports and catalytic hydroconversion processes using the supported catalysts have provided generally good results for hydrogenation and hydroconversion of coal and heavy oil feed materials, some disadvantages of such particulate supported type catalysts are their relatively poor contact with the feed materials and their rapid deactivation caused by deposition on the catalyst of coke and metal contaminants such as iron, nickel, titanium and vanadium contained in the feeds. U.S. Pat. No. 4,136,013 to Moll et al discloses an emulsion type metal catalyst useful for hydrogenation processes, but it also has disadvantages of low catalytic activity and high catalyst usage. At the levels of catalyst usage disclosed in the Moll et al. patent, the catalyst cost becomes prohibitive unless the catalyst is recovered from the unconverted feed material and reused. U.S. Pat. Nos. 4,077,867 and 4,134,825 to Bearden et al. disclose an in-situ formed metal-carbon containing dispersed slurry catalyst called 'M-Coke' for hydroconversion of coal, heavy oil, and mixtures thereof, and are primarily based on molybdenum which is significantly more expensive than iron. U.S. Pat. No. 4,486,293 to Garg disclosed a co-catalyst combination of iron and Group VI or VIII non-ferrous metal for liquefaction of coal in hydrogen-donor solvent using water soluble salts of the co-catalyst metals.

It is known that catalysts formed from water-soluble precursor salts often undergo sintering under coal liquefaction conditions and lack the high degree of dispersion necessary for high catalytic activity. U.S. Pat. No. 4,895,821 to Kainer et al discloses a fine grained iron oxide catalyst composition produced by reacting the iron oxide with sulfuric and phosphoric acids. U.S. Pat. No. 5,168,088 to Utz et al. discloses a unique way of improving a slurry catalyst dispersed during coal liquefaction by precipitating the iron oxide onto the coal matrix. However, such precipitation of a catalyst on the entire coal feed would be difficult and very expensive for commercial scale operations. Thus, further improvements are needed in catalyst forms and compositions and also in processes for catalytic hydroprocessing of various carbonaceous feedstocks, particularly for utilizing dispersed iron-oxide based catalysts that are highly active, environmentally benign, and less expensive for the catalytic hydroconversion processes in which they are used.

In the improved process of this invention for catalytically hydrogenating and hydroconverting heavy hydrocarbon feed material such as coal, the coal is pulverized and fed as a slurry containing a highly dispersed iron-based catalyst into a first-stage, back-mixed reactor together with hydrogen at appropriate high temperature and pressure conditions, and is reacted to break down the high molecular weight carbonaceous materials into lower molecular weight, lower sulfur, and lower boiling hydrocarbon distillates and gases. Prior processes for direct catalytic liquefaction of coal and heavy oils are significantly different, in that they use particulate supported type catalysts in either fixed bed type reactors or fluidized ebullated bed type reactor systems. Also, some prior coal hydrogenation processes are dependent on separate hydrogenation of the coal slurrying oil to provide a hydrogen donor solvent liquid in the reactor. But no known prior hydrogenation processes for heavy hydrocarbon feed materials contain the combination of process steps and maximization of catalyst activity and reactor kinetics provided by this invention.

It is known that carbonaceous material deposition occurs in coal liquefaction reactor systems that are not mechanically back-mixed and that ebullated bed type catalyst systems using particulate supported catalysts experience rapid catalyst aging and deactivation and are difficult to operate. However, this invention avoids such operational problems by the continuous addition of fresh highly dispersed iron-based gel or liquid type catalyst into two-staged reactors, which are utilized in combination with an in-line fixed bed catalytic hydrotreating reactor containing a supported type catalyst that hydrotreats light and medium boiling range distillate fractions from the prior catalytic liquefaction steps, so that the supported hydrotreating catalyst is not exposed to the heavy unconverted residuum and ash from the coal feed, and its resulting catalyst deactivation rate is minimal. Additionally, for lower rank, high-oxygen containing coals and in catalytic two-stage reactor processes without an interstage phase separation step, hydrogen is undesirably consumed by converting the oxygen in the feed to water, and in increased production of undesired light $C_1$–$C_3$ gases in the second stage catalytic reactor. However, such disadvantages of the prior art processes have now been overcome by providing a catalytic multi-stage hydrogenation process having an interstage phase separation step, so that hydrogen consumption is reduced because the oxygen contained in the coal feed is removed as $CO_2$, and the light distillates are removed for fixed bed catalytic hydrotreatment and molecular rearrangement at lower temperature. Furthermore, removal of light fractions in the interstage separation step improves kinetics in the second stage catalytic reactor by increasing the concentration of heavy oils and coal-derived liquids and hydrogen partial pressure entering the second stage reactor. Although some known coal liquefaction and oil hydrotreating technologies have incorporated in-line fixed-bed catalytic hydrotreating step, but none have provided the combination and process sequence utilized in the present invention for maximizing hydrogenation, molecular rearrangement, and heteroatom removal for the most valuable distillate fractions produced in combination with dual backmixed highly dispersed catalytic reactor systems. The production of clean, high quality liquid fuels from heavy hydrocarbon feed materials such as coal, petroleum, and plastic wastes at high efficiency by utilizing this invention could not be foreseen or expected from the known individual process steps.

SUMMARY OF INVENTION

This invention provides a catalytic multistage process for hydroconversion and refining hydrocarbon feed materials including coal, heavy oils, waste plastics, and combinations thereof, for producing mainly clean low-boiling hydrocarbon liquid fuel products. In particular, the invention provides such a catalytic hydroconversion process utilizing a highly dispersed stable iron-based catalyst that is added uniformly to the hydrocarbon feed material, such as to a coal-oil slurry or heavy oil feed stream. The hydrocarbon feed and dispersed catalyst are preheated and fed together with hydrogen into a first stage, back-mixed catalytic reactor in which the feed material is hydrogenated and hydrocracked. Broad first stage reaction conditions are 700–850° F. temperature, 1000–3500 psig. hydrogen partial pressure and 20–80 lb/ft$^3$.h space velocity. The catalyst can be a dispersed iron-based gel or powder slurried catalyst as described in our co-pending patent application U.S. Ser. No. 08/742/541, filed Nov. 1, 1996, now U.S. Pat. No. 5,871,638, and which is being incorporated herein by reference to the extent necessary to describe the catalyst. Alternatively, the catalyst can be an iron-based ionic liquid or liquid-gel catalyst having a pH of 0.1–3.0 as described in our co-pending patent application entitled "Iron-Based Ionic Liquid Catalysts for Hydroprocessing Carbonaceous Feeds" filed Jan. 28, 1999, Ser. No. 09/238,310 and which is incorporated herein by reference to the extent necessary to describe the ionic liquid or liquid-gel catalyst. Use of the iron-based ionic liquid type catalyst having a pH of 0.1–0.5 is usually preferred. Catalyst loading in the first stage reactor should be 200–15,000 wppm iron relative to the fresh hydrocarbon feed in the reactor, and preferably 500–10,000 wppm iron relative to fresh feed.

From the first stage catalytic reactor, a first effluent stream is pressure-reduced by 50 to 500 psig and passed to primary interstage phase separator, from which hydrocarbon vapor and light liquid stream is removed overhead and passed to a secondary interstage phase separator for further removal of light hydrocarbon gases and undesired other vapors from a light hydrocarbon liquid fraction steam. The remaining liquid bottoms stream withdrawn withdrawn from the primary interstage separator is passed into a lower pressure second stage catalytic back-mixed reactor for further hydrocracking of the hydrocarbon liquid fraction in the presence of the highly dispersed iron-based catalyst. If needed, additional catalyst can be injected directly into the second stage reactor to maintain the desired 500–10,000 wppm iron concentration relative to feed therein. Broad second stage reaction conditions are 750–900° F. temperature and 800–3000 psig. hydrogen partial pressure.

From the second stage catalytic reactor, a second effluent stream is phase-separated in a second stage separator. It is an important feature of this invention that the lower boiling hydrocarbon vapors and light liquid fraction removed overhead from the second stage separator are combined with the light liquid fraction from the secondary inter-stage separator, are both combined streams and passed to an in-line catalytic fixed bed hydrotreating reactor at the existing lower temperature and hydrogen partial pressure conditions for removal of heteroatoms, and to further hydrogenate and polish the light distillate liquid fraction into a clean liquid fuel product. Useful reaction conditions in the catalytic fixed bed hydrotreater are 500–800° F. temperature, 800–3,000 psig hydrogen partial pressure, and 0.2–5.0 h$^{-1}$ space velocity. The catalyst used in the hydrotreater reactor may be a known particulate hydrotreating catalyst such as cobalt-molybdenum or nickel-molybdenum on alumina support.

The bottoms liquid fraction withdrawn from the second stage separator and containing unconverted hydrocarbons is next distilled at successive atmospheric and vacuum pressures for recovery of higher boiling oils as products, and for at least partial recycle of vacuum bottoms material containing some used iron-based catalyst back to the reactors for further hydroconversion. If desired, the vacuum bottom material fraction can be further processed by either selective critical solvent separation or by a solids filtration step to yield additional heavy oil product, and a heavy liquid solids-containing hydrocarbon slurry stream suitable either for combustion or for partial oxidation to produce the hydrogen needed for the process.

The present invention advantageously provides an improved catalytic multi-stage process for hydroprocessing heavy hydrocarbon feed materials to produce low-boiling hydrocarbon liquid products, by utilizing two-staged dispersed catalyst reactors with successive primary and secondary interstage phase separators and a catalytic fixed bed in-line hydrotreater for enhancing distillate yield and quality, and by improving the second stage reactor kinetics to hydrotreat $C_4$–750° F. distillates and enable removal of oxygen contained in the feed as a carbon oxide instead of consuming hydrogen in the undesirable formation of water. Prior catalytic hydrogenation processes for such carbonaceous feed materials do not incorporate the unique balance provided by the present process, i.e., the combination of utilizing highly dispersed iron-based slurried catalysts in the reactors, the interstage phase separations for removal of light hydrocarbon vapors the in-line pressurized catalytic fixed bed hydrotreating step so that only a higher boiling bottoms liquid fraction is passed on to the second stage catalytic reactor, and the selectivity of liquid extinction recycle of the vacuum bottoms material. The hydrocarbon liquid products from this invention have very high quality and can be used as produced or combined to make reformulated fuels. This catalytic two-stage, back-mixed dispersed catalyst hydrogenation process advantageously circumvents the complexity of known fixed bed and ebullated bed type catalytic reactor systems utilizing particulate supported catalysts, any reactor exotherms are easily controlled, and carbon and metals deposition on the particulate catalyst beds and flow maldistributions in the back-mixed reactors are avoided. Although this process is particularly useful for catalytic hydrogenation and hydroconversion of coal feeds, it is also useful for feedstreams containing heavy petroleum residua, waste plastics and combinations thereof. Beneficial process results provided by this invention, in particular the combining of beneficial individual operations, have been demonstrated in continuous laboratory test runs at 25–50 kg per day of coal feed.

BRIEF DESCRIPTION OF DRAWINGS

The process of this invention will now be described with reference to the following drawings, in which.

DESCRIPTION OF INVENTION

Figure 1:
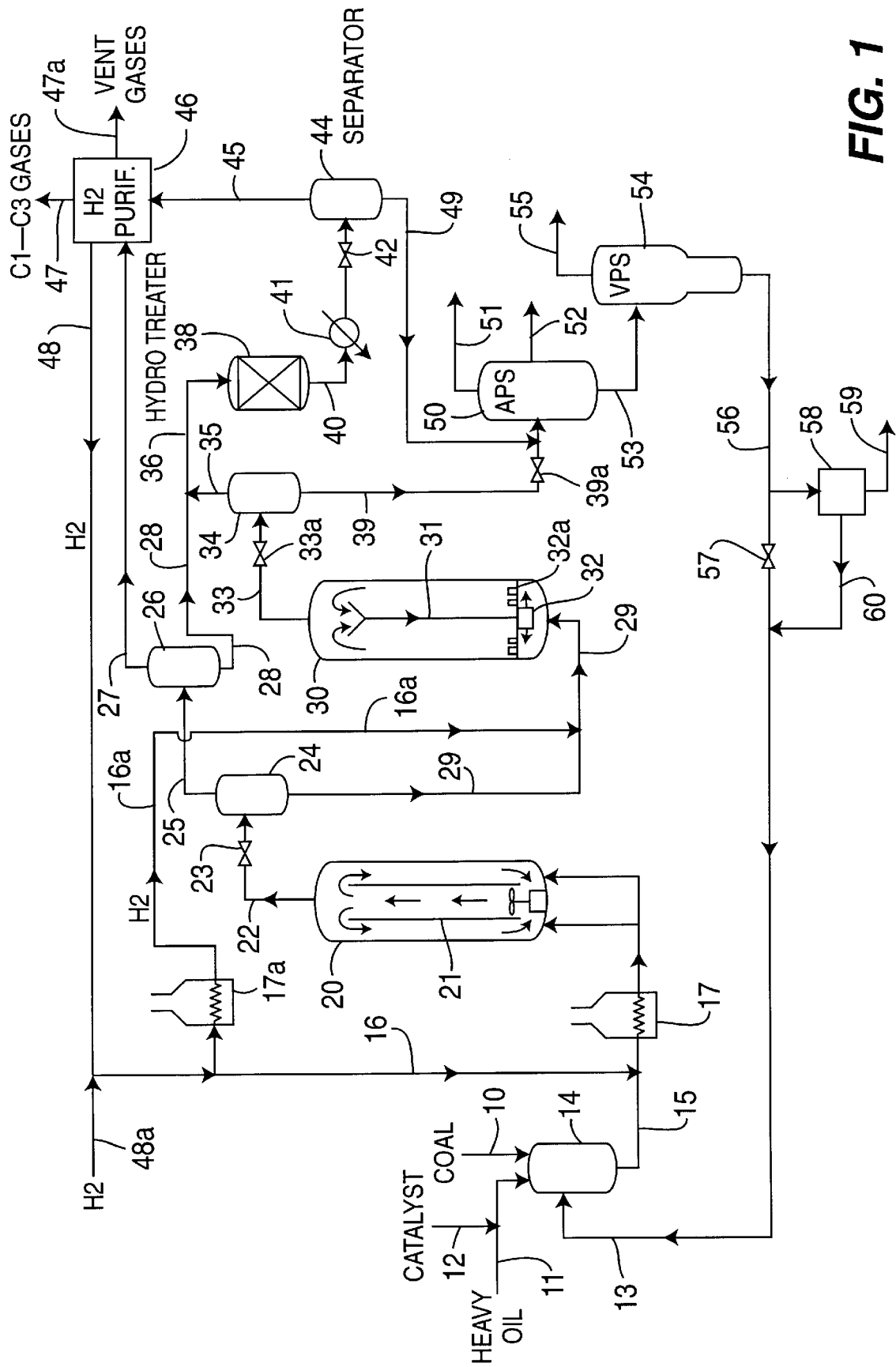
FIG. 1 is a schematic flowsheet of a catalytic multi-stage process for hydrogenation of heavy carbonaceous feed materials utilizing either a dispersed iron-based powder, gel or ionic liquid type catalyst in two staged back-mixed catalytic reactors with interstage phase separation, and a fixed bed hydrotreating reactor containing a particulate supported type catalyst.

This invention provides an improved catalytic multistage process for liquefaction, hydrogenation, hydroconversion and hydrotreating upgrading for coal and/or other heavy hydrocarbon feedstocks by utilizing a highly dispersed iron-based catalyst in two-staged reactors and a particulate supported type catalyst in a direct connected in-line fixed bed hydrotreating reactor. As shown in FIG. 1, a particulate coal feed is provided at 10, a heavy hydrocarbon slurrying oil or feedstock is provided at 11, and both are mixed together with either a finely dispersed iron-based catalyst or an iron-based ionic liquid or liquid-gel catalyst provided at 12. The coal, heavy hydrocarbon oil and catalyst are all mixed together in mixing tank 14 along with some previously processed recycle oil and containing some used catalyst at 13. The mixed coal, oil and the iron-based dispersed or ionic liquid catalyst at 15 are pressurized and fed to preheater 17, together with fresh and recycled hydrogen provided at 16. The resulting heated feedstream is fed upwardly into a first stage, back-mixed catalytic reactor 20 in which dissolution, hydrocracking, and hydroconversion reactions occur. The reactor 20 can be back-mixed mechanically by a suitable internal pump recirculation means 21, or by other known mechanical mixing devices suitable for pressurized reactors. Broad reaction conditions for reactor 20 are in the ranges of 700–850° F. temperature, 1000–3500 psig hydrogen partial pressure and 20–80 lb. feed/ft$^3$-h space velocity, with catalyst loading in the reactor 20 being 200–15,000 wppm iron relative to fresh feed. Preferred reaction conditions are 750–840° F. temperature and 1200–3000 psig. hydrogen partial pressure.

From the first stage catalytic reactor 20, a first effluent stream 22 is pressure-reduced at valve 23 by 50–500 psi and passed to hot primary interstage phase separator 24, from which vapors and low-boiling hydrocarbon distillates are removed as overhead stream 25 and passed to secondary interstage phase separator 26 to provide an overhead hydrocarbon vapor fraction 27 and liquid a bottoms fraction 28. The remaining heavier bottoms liquid stream 29 from the interstage separator 24 is mixed with additional hydrogen 16a from preheater 17a, as needed and passed to second stage catalytic reactor 30 for further hydrocracking reactions, usually at 10–50° F. higher temperature than for reactor 20. The second stage catalytic reactor 30 is back-mixed utilizing either downcomer conduit 31 connected to internal recycle pump 32 and including flow distribution plate 32a, or by a similar effective back-mixing flow configuration. Preferred second stage reaction conditions are 780–850° F. and 1000–2500 psig hydrogen partial pressure.

From the second stage reactor 30, second effluent stream 33 pressure-reduced at valve 33a by 50–500 psi and passed to second stage hot separator 34 for removing vapors and light fractions overhead at 35 and providing a bottoms liquid stream 39. The light hydrocarbon liquid bottoms fraction stream 28 from the phase secondary interstage separator 26 is combined with the overhead stream 35 from the second stage phase separator 34 to provide a combined stream 36 which is fed to an in-line fixed bed catalytic hydrotreater 38, which provides for heteroatom removal, hydrogenation, and molecular rearrangement reactions and produces clean hydrocarbon product stream 40. Preferred reaction conditions for the catalytic fixed bed hydroteater 38 are 550–750° F. temperature, 800–2500 psig hydrogen partial pressure, and space velocity of 0.2–2.0 hr$^{-1}$. From the hydrotreater 38, the product stream 40 is cooled at 41, pressure-reduced at valve 42, and phase separated at product separator 44 to provide overhead vapor stream 45. The vapor stream 45 is passed to together with the vapor stream 27 a gas unit 46 for removing $C_1$–$C_3$ gases at 47, and $CO_2$, undesired $H_2S$ and ammonia and water vapor. The undesired vent gases are removed at 47a. Purified hydrogen at 48 is recycled as streams 16 and 28 back to the first and second stage reactors 20 and 30 respectively, along with make-up hydrogen provided at 48a as needed.

From the second stage separator 34, a bottoms liquid stream 39 is pressure-reduced at valve 39a and distilled in atmospheric pressure still 50 along with hydrotreated distillates stream 49 from the product separator 44 to yield an overhead IBP-400° F. (IBP-204° C.) stream 51, a 400–650° F. (204–343° C.) stream 52, and a bottoms liquid stream 53. The bottoms stream 53 is passed to vacuum distillation tower 54 to produce an overhead 650–975° F. (343–524° C.) vacuum gas oil stream 55, and a concentrated heavy residual bottoms stream 56 containing some of the dispersed iron-based catalyst for recycle as the stream 13.

If needed particularly for coal feed containing ash, the concentrated bottoms stream 56 may be diverted by valve 57 and further treated by either liquid/solids filtration or by selective solvent separation at section 58 to recover more heavy oil at 60 for recycle stream 13. A concentrated bottoms stream 59 containing ash, unconverted hydrocarbons, and some catalyst residue can be fed to a partial oxidation step (not shown) to produce hydrogen needed in the process.

Figure 2:
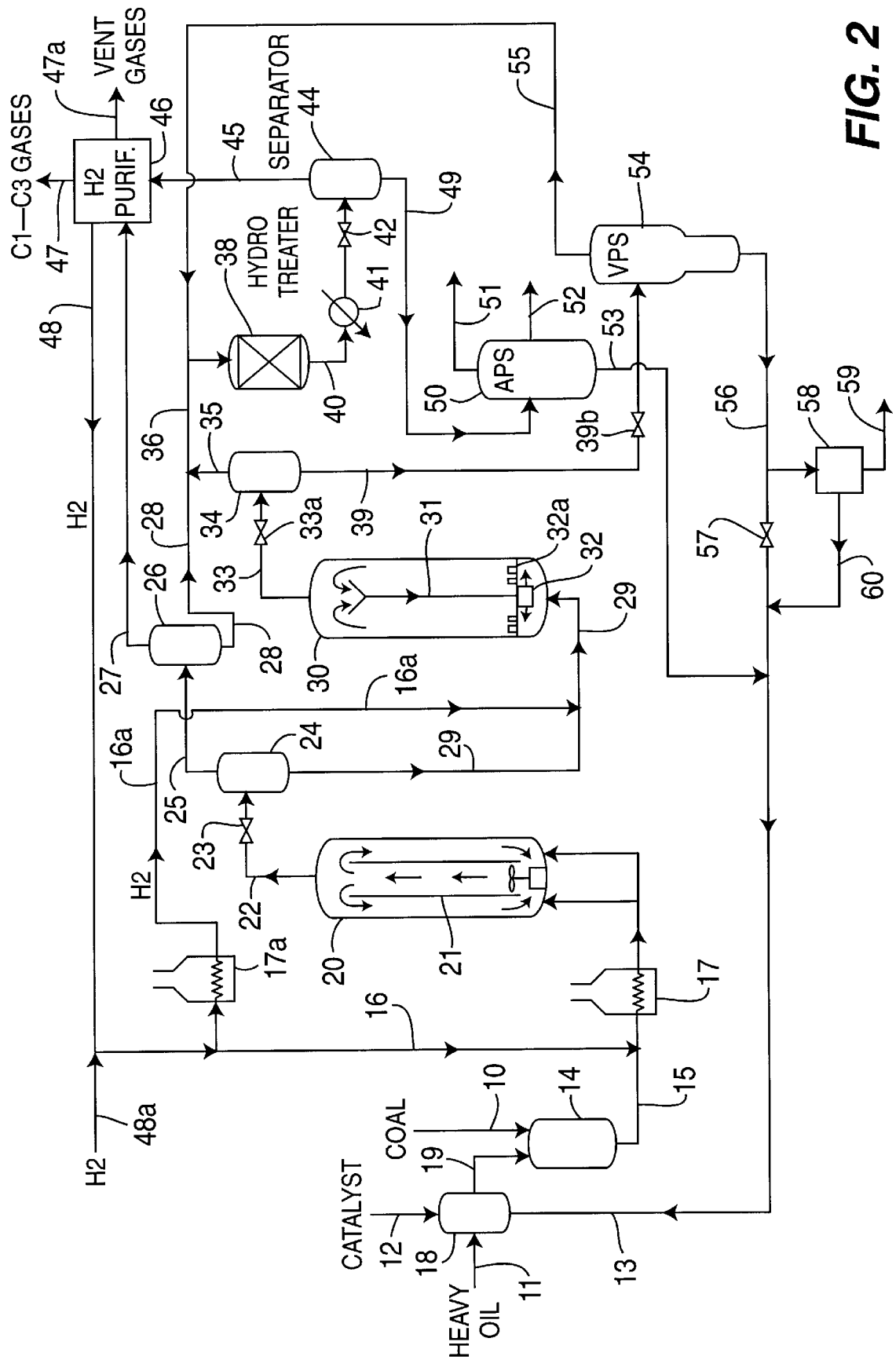
FIG. 2 is a schematic flowsheet of an alternative catalytic multi-stage hydrogenation process for mainly particulate coal feeds

In an alternative process as shown FIG. 2, the heavy recycle liquid stream 13 is intimately premixed at first mixing tank 18 with the oil heavy feed 11 and the catalyst 12, before the premixed stream 19 is introduced along with the particulate coal feed 10 into the main mixing tank 14. Also, the over head vacuum gas oil stream 55 from vacuum still 54 is mixed with the combined light liquid fractions stream 36 and passed to the catalytic in-line hydrotreating reactor 38 for further hydrotreatment reactions for producing additional low-boiling liquid produce at 40. Also, the liquid bottoms stream 39 from the second stage separator 34 is pressure-reduced at 39b and introduced directly into the vacuum still 54, and heavy liquid stream 53 from atmospheric pressure still 90 is combined with heavy liquid stream 56 for recycle as stream 13.

This invention will be described further by use of the following examples, which should not be construed as limiting the scope of the invention

EXAMPLE 1

For the catalytic multi-stage hydrogenation process of this invention, the interstage phase separation step provided between the two staged catalytic reactors for removal of vapors and light liquid fractions provides several beneficial results. For low rank coal feeds that contain significant concentrations of oxygen, this oxygen is removed from the process as $CO_x$ rather than as $H_2O$, thereby desirably reducing hydrogen requirements for the process. In addition, less $C_1$–$C_3$ hydrocarbon gases are produced, because any excess hydrocracking of the liquid feedstream to the second stage catalytic reactor is minimized. A comparison is made of two similar catalytic two-stage hydrogenation processes for a US sub-bituminous coal feed, with and without an interstage phase separation step, and important comparative process results are provided in Table 1 as follows.

TABLE 1

| Comparative Process Results, wt. % MAF Coal | Prior Process Without Interstage Separation | Present Process With Interstage Separation |
|---|---|---|
| $C_1$–$C_3$ Gases | 7.3 | 6.5 |
| $C_4$–$C_7$ | 4.1 | 4.1 |
| $C_4$–975° F. Liquids | 59.4 | 61.6 |
| 975° F. Resid | 2.0 | 2.2 |
| $CO_x$ | 2.3 | 5.3 |
| Water | 19.4 | 17.1 |
| $H_2$ Consumption | 7.4 | 7.5 |

These results show that for the present two-stage catalytic process with an interstage phase separation step, a reduction in the light $C_1$–$C_3$ gases occurs along with substantial increase in $CO_x$, and a decrease in water produced at essentially the same correlated operating conditions and liquid yields.

For comparative two-stage hydrogenation process runs made with bituminous Illinois #6 coal feed at similar operating conditions with and without interstage phase separation, comparative process results are provided in Table 2 below.

TABLE 2

| Comparative Process Results | CMSL-02 | CMSL-05 |
|---|---|---|
| Interstage Separation Step | No | Yes |
| Relative Reaction Severity | 1.1 | 1.25 |
| $C_4$–975° F. Yield, wt. % MAF Coal | 76 | 78 |
| 975° F.+ Resid Conversion, wt. % MAF Coal | 91 | 94 |
| $H_2$ Consumption, wt. % MAF Coal | 8.3 | 8.0 |

These results show that by removing the vapors and light liquid fractions in the interstage separation step, the yield of $C_4$-975° F. liquid product and conversion of the resid (975° F.+) fraction is significantly higher as a result of an increased concentration of primary coal-derived intermediate liquids in the second stage reactor, and hydrogen consumption was desirably reduced.

EXAMPLE 2

A further comparison was made for a catalytic two-stage reactor hydrogenation process with and without interstage phase separation for a blended feedstream of 35 wt. %sub-bituminous coal and 65% Hondo petroleum resid. The results are provided in Table 3 below.

TABLE 3

| | Without Interstage Separation | With Interstage Separation |
|---|---|---|
| Normalized Yields, w % MAF Feed | | |
| Relative Reaction Severity | 43 | 46 |
| $C_1$–$C_3$ Gases | 6.2 | 7.3 |
| $C_4$–$C_7$ Liquid | 9.7 | 9.3 |
| Naphtha ($C_4$–3250° F.) | 17.7 | 21.6 |
| Mid-Distillate (350–650° F.) | 31.5 | 37.3 |
| Heavy Distillate (650–975° F.) | 26.7 | 20.1 |
| Resid (975° F.+) | 10.4 | 7.5 |
| Process Performance, wt. % MAF Feed | | |
| Coal Conversion | 92.6 | 95.7 |
| 975° F. Resid Conversion | 85.4 | 89.8 |
| $C_4$–975° F. Product Yield | 75.8 | 79.1 |
| $H_2$ Consumption | 4.45 | 4.78 |

From these results, it is seen that generally higher conversion of the blended coal and resid feed and higher $C_4$-975° F. product yield are achieved at similar reaction conditions when utilizing an interstage phase separation step. This improvement is due mainly to improved reaction kinetics which occur for the liquid feed in the second stage reactor.

EXAMPLE 3

Utilizing an in-line catalytic hydrotreating step for the combined two staged reactor effluent vapor and light liquid fraction streams in this catalytic two-stage hydrogenation process is a very effective and economical step for reducing heteroatom content and aromatics in the product oil. The exothenm available from hydrogenation of the coal or heavy hydrocarbon oil feed and the high hydrogen partial pressure which is available from the prior reactors is utilized effectively in the catalytic in-line hydrotreating reactor, and a significant $3–$6/bbl improvement in product oil value is realized. Typical comparative results for in-line catalytic hydrotreating of a naphtha fraction derived from two-stage catalytic reactor operations on a sub-bituminous coal feed are shown in Table 4 below:

TABLE 4

| Quality Of In-line Hydrotreated Naphtha Fraction | | |
|---|---|---|
| Product Characteristics In-line Hydrotreating | No | Yes |
| °API Gravity | 36.2 | 39.9 |
| Carbon, wt. % | 86.6 | 86.3 |
| Hydrogen, wt. % | 13.3 | 13.7 |
| Nitrogen, wppm | 1,280 | 9 |
| Sulfur, wppm | 230 | 14 |
| Mid-Boiling Temperature, ° F. | 421 | 401 |
| Hydrogen/Carbon Ratio | 1.85 | 1.91 |

From the above comparison, it is seen that the hydrotreated naphtha product has a desirably higher °API gravity and substantially lower nitrogen and sulfur contents as compared to the unhydrotreated naphtha product.

Further comparative results showing the desirable changes in characteristics between a hydrocarbon feedstream to in-line catalytic hydrotreating step and the resulting hydrotreated product are shown below in Table 5.

TABLE 5

| Stream Characteristics | Feed Stream To Hydrotreater | | Hydrotreated Product | |
|---|---|---|---|---|
| Gravity, °API | 39.6 | | 46.2 | |
| Carbon, wt. % | 86.2 | | 83.2 | |
| Hydrogen, wt. % | 13.2 | | 12.9 | |
| Sulfur, wppm | 297 | | 9 | |
| Nitrogen, wppm | 161 | | 1 | |
| Boiling Ranges, °F. | IBP–350 | 350–650 | IBP–350 | 350–650 |
| Paraffins, wt. % | 24.3 | 12.2 | 22.8 | 13.7 |
| Olefins, wt. % | 0.3 | — | 0.5 | — |
| Naphthenes, wt. % | 67.0 | 48.2 | 69.3 | 55.7 |
| Aromatics, wt. % | 8.4 | 39.6 | 7.4 | 30.6 |
| Cetane Index | | 38.0 | | 39.5 |
| Cetane Number | — | | | 39.0 |

From the above comparative results, it is seen that by utilizing catalytic in-line hydrotreating for the feedstream, the heteroatoms, sulfur, and nitrogen are nearly totally removed, while the aromatics are decreased and napthenes are correspondingly increased for both boiling range fractions. Thus, the catalytic two-stage combined process utilizing an iron-based, dispersed slurry catalyst system in staged back-mixed reactors with interstage phase separation for vapor and light liquid fraction removal, and an in-line fixed bed hydrotreating step produces a product having superior characteristics and at reduced operating cost.

EXAMPLE 4

A direct comparison of a known prior catalytic two-stage liquefaction (CTSL) process using two staged close-coupled ebullated bed reactors each containing a particulate supported type catalyst or a dispersed type catalyst compared with the present catalytic two-stage reaction process utilizing highly dispersed iron-based slurry catalyst together with interstage phase separation and in-line catalytic hydrotreating step for a sub-bituminous coal feed is shown below in Table 6.

TABLE 6

Catalytic Two Stage Coal Liquefaction of Sub-Bituminous Coal Feed

| Process Arrangement | Supported Particulate Catalyst | Dispersed Catalyst Iron/Moly | GelCat ™ Iron/Moly/P |
|---|---|---|---|
| Run Designation | CC-1 | CMSL-6 | PB-04 |
| Interstage Phase Separation | None | None | Yes |
| In-Line Catalytic Hydrotreating | None | None | Yes |
| Performance, wt. % MAF Coal | | | |
| $C_1$–$C_3$ Gases | 8.0 | 8.0 | 7.9 |
| $CO_x$ | 0.5 | 4.5 | 6.5 |
| $H_2O$ | 18.5 | 14.0 | 12.1 |
| Coal Conversion | 86.4 | 94.1 | 93.2 |
| $C_4$–975° F. Liquid Fraction | 62.6 | 63.1 | 67.5 |
| 975° F.+ Fraction Conversion | 84.8 | 83.0 | 89.4 |
| $H_2$ Consumption | 7.7 | 7.1 | 7.2 |

As can be seen from the Table 6 results, the present catalytic two-stage hydrogenation process including interstage phase separation and in-line catalytic hydrotreating steps provides a significant increase in $CO_x$ and decrease in water yields, and also provides increased product distillate yields and percent conversion without having an increased hydrogen consumption penalty. The projected cost per barrel of oil product from coal feed for the present process is only about $28/bbl as compared with $32–38/bbl for the known catalytic two-stage process having close-coupled reactors each utilizing a supported type catalyst.

Although this invention has been disclosed broadly and also in terms of preferred embodiments, it will be understood that process modifications and variations can be made all within the invention scope as defined by the following claims:

What is claimed is:

1. A catalytic multi-stage process for hydrogenation and hydroconversion of heavy carbonaceous feed materials to produce lower-boiling hydrocarbon liquid products, the process comprising:
   (a) reacting a carbonaceous feed material together with a highly dispersed iron-based catalyst and hydrogen in a first stage back-mixed catalytic reactor maintained at reaction conditions of 700–850° F. (370–460° C.) temperature, 1000–3500 psig hydrogen partial pressure, 20–80 lb/h/ft$^3$ (320–1280 kg/h/m$^3$) reactor space velocity, and catalyst loading of 500–15,000 wppm iron relative to the feed, and providing a first reactor effluent stream containing vapor and liquid fractions;
   (b) phase separating said first stage reactor effluent stream into its vapor and liquid fractions in successive primary and secondary interstage separators to provide separator overhead and bottoms streams, and further reacting the remaining primary interstage separator bottoms liquid fraction in a second stage back-mixed catalytic reactor to provide a second reactor effluent stream containing vapor and liquid fractions;
   (c) phase separating said second stage reactor effluent stream into its vapor and liquid fractions to provide a second stage separator overhead stream and a bottoms liquid fraction, and combining the second stage separator overhead fraction stream with said secondary interstage phase separator bottoms fraction stream, and catalytically hydrotreating the combined streams in an in-line fixed bed catalytic multistage hydrotreating reactor to provide a hydrotreated liquid product; and
   (d) distilling said bottoms liquid fraction from said second stage phase separation step, and withdrawing low-boiling hydrocarbon liquid products from the process.

2. A catalytic multistage hydrogenation process according to claim 1, wherein the carbonaceous feed material is particulate coal and the reaction conditions are 750–840° F. (400–450° C.) temperature, 1200–3000 psig hydrogen partial pressure, and space velocity of 25–65 lb/hr/ft$^3$ (400–1000 kg/h/m$^3$) reactor volume.

3. A catalytic multistage hydrogenation process according to claim 1, wherein the first stage reactor temperature is 20–90° F. (10–50° C.) lower than that of the second stage reactor.

4. A catalytic multistage hydrogenation process according to claim 1, wherein the first stage reactor temperature is 20–90° F. (10–50° C.) higher than that of the second stage reactor.

5. A catalytic multistage hydrogenation process according to claim 1, wherein reaction conditions for said catalytic fixed bed hydrotreating reactor are 500–800° F. temperature, 800–3000 psig hydrogen partial pressure, and 0.2–5.0 hr$^{-1}$ space velocity.

6. A catalytic multistage hydrogenation process according to claim 1, wherein the carbonaceous feed material is coal.

7. A catalytic multistage hydrogenation process according to claim 1, wherein the carbonaceous feed material is heavy petroleum resid.

8. A catalytic multistage hydrogenation process according to claim 1, wherein the carbonaceous feed material is a mixture of coal and heavy petroleum resid.

9. A catalytic multistage hydrogenation process according to claim 1, wherein the carbonaceous feed material is a mixture of coal and co-mingled plastics waste.

10. A catalytic multistage hydrogenation process according to claim 1, wherein the carbonaceous feed material is a mixture of heavy petroleum resid and co-mingled plastics waste.

11. A catalytic multistage hydrogenation process according to claim 1, wherein the carbonaceous feed material is a mixture of coal, heavy petroleum resid, and co-mingled plastics waste.

12. A catalytic multistage hydrogenation process according to claim 1, wherein the iron-based catalyst is an ionic liquid having a pH of 0.1–3.0.

13. A catalytic multistage hydrogenation process according to claim 1, wherein a vacuum distillation overhead stream is recycled to the catalytic in-line hydrotreating reactor.

14. A catalytic multistage hydrogenation and hydroconversion process for coal feed utilizing a highly dispersed iron-based catalyst in combination with interstage phase separation and in-line catalytic multistage hydrotreating to maximize the yield of low-boiling hydrocarbon liquid products, the process comprising:

(a) feeding particulate coal together with a hydrocarbon slurrying oil and a highly dispersed iron-based ionic liquid catalyst and hydrogen into a pressurized first stage back-mixed reactor containing coal-derived liquid and hydrogen, said catalyst providing 500–15,000 wppm iron based on the coal feed;

(b) reacting said combined coal slurry, dispersed catalyst and hydrogen in said first stage catalytic reactor maintained at reaction conditions of 750–840° F. temperature, 1200–3000 psig hydrogen partial pressure and space velocity of 20 to 80 lb. coal/hr per ft$^3$ reactor volume to heat and catalytically hydrogenate the coal and provide a partially hydrogenated and hydroconverted coal-derived first reactor effluent material containing vapor and liquid fractions;

(c) removing said first stage reactor effluent material stream containing vapor and liquid fractions, reducing the effluent-stream pressure by 50–500 psig, and phase separating the first stage reactor effluent stream in a primary interstage phase separator to provide vapor and light overhead fractions and a primary separator bottoms liquid material stream; further phase separating said light overhead fractions in a secondary interstage phase separator to provide an overhead vapor stream and a bottoms liquid stream;

(d) passing said primary interstage separator bottoms material stream to a second stage catalytic reactor together with additional hydrogen as needed, said second stage reactor being maintained at 780–850° F. temperature and 1000–2500 psig hydrogen partial pressure, and further hydrocracking the liquid fraction bottoms material therein and providing a second stage reactor effluent material stream containing vapors and lower boiling hydrocarbon liquid fractions;

(e) phase separating said second stage reactor effluent material stream into its overhead vapor and light liquid fractions and a bottoms liquid fraction; combining the overhead vapor and light liquid fractions from the second stage reactor phase separator with said secondary interstage separator bottoms stream, and catalytically hydrotreating the combined vapor and light liquid fractions in an in-line fixed bed catalytic multistage hydrotreating reactor at 500–800° F. temperature and 800–3000 psi pressure for further reactions and heteroatom removal to provide a hydrotreated liquid product;

(f) distilling said bottoms liquid fraction from said second stage phase separator in successive atmospheric and vacuum pressure distillation steps, and recycling at least a portion of a vacuum distillation bottoms liquid stream back to the coal slurrying step; and (g) recovering hydrocarbon gas and low-boiling upgraded $C_4$-750° F. fraction hydrocarbon liquid products from the process.

15. The catalytic multistage hydrogenation process of claim 14, including further treating the catalytic multistage hydrotreating reactor product stream to remove $C_1$–$C_3$ gases, and $CO_2$, $NH_3$ and $H_2S$ impurities, and providing purified hydrogen for recycle back to at least said first stage reactor.

16. The catalytic multistage hydrogenation process of claim 14, wherein the recycled vacuum distillation liquid bottoms stream is further processed for solids removal by liquid/solids filtration or by selective critical solvent separation to recover additional hydrocarbon liquid.

17. The catalytic multistage hydrogenation and hydroconversion process of claim 1, wherein said first the reactor effluent stream is phase separated successively in said primary interstage phase separator and in said secondary interstage separator to provide a secondary interstage separator overhead stream which is further treated for recovery of hydrocarbon gases and hydrogen, and said primary interstage separator bottoms stream for passing to said second stage catalytic reactor.

18. The catalytic multistage hydrogenation and hydroconversion process of claim 1, wherein the second stage catalytic reactor is maintained at reaction conditions of 750–840° F. temperature and 800–3000 psig hydrogen partial pressure.

19. The catalytic multistage hydrogenation and hydroconversion process of claim 1, including further treating the catalytic multistage hydrotreating reactor product stream to remove $C_1$–$C_3$-gases and $CO_2$, $NH_3$ and $H_2S$ impurities, and providing purified hydrogen for recycle back to at least said first stage catalytic reactor.

20. The catalytic multistage hydrogenation and hydroconversion process of claim 1, including recycling a distillation bottoms liquid fraction back to said first stage catalytic reactor.

21. The catalytic multistage hydrogenation and hydroconversion process of claim 1, wherein a distillation bottoms liquid fraction stream is further processed for solids removal and recovery of additional heavy hydrocarbon liquid product.

22. The catalytic multistage hydrogenation and hydroconversion process of claim 1, wherein said liquid fraction stream from said second stage phase separator is distilled at vacuum pressure, a vacuum distillation overhead stream is recycled to said catalytic in-line hydrotreating reactor, and at least a portion of the vacuum pressure distillation bottoms stream is recycled back to the coal slurrying step.

* * * * *